United States Patent Office 3,798,315
Patented Mar. 19, 1974

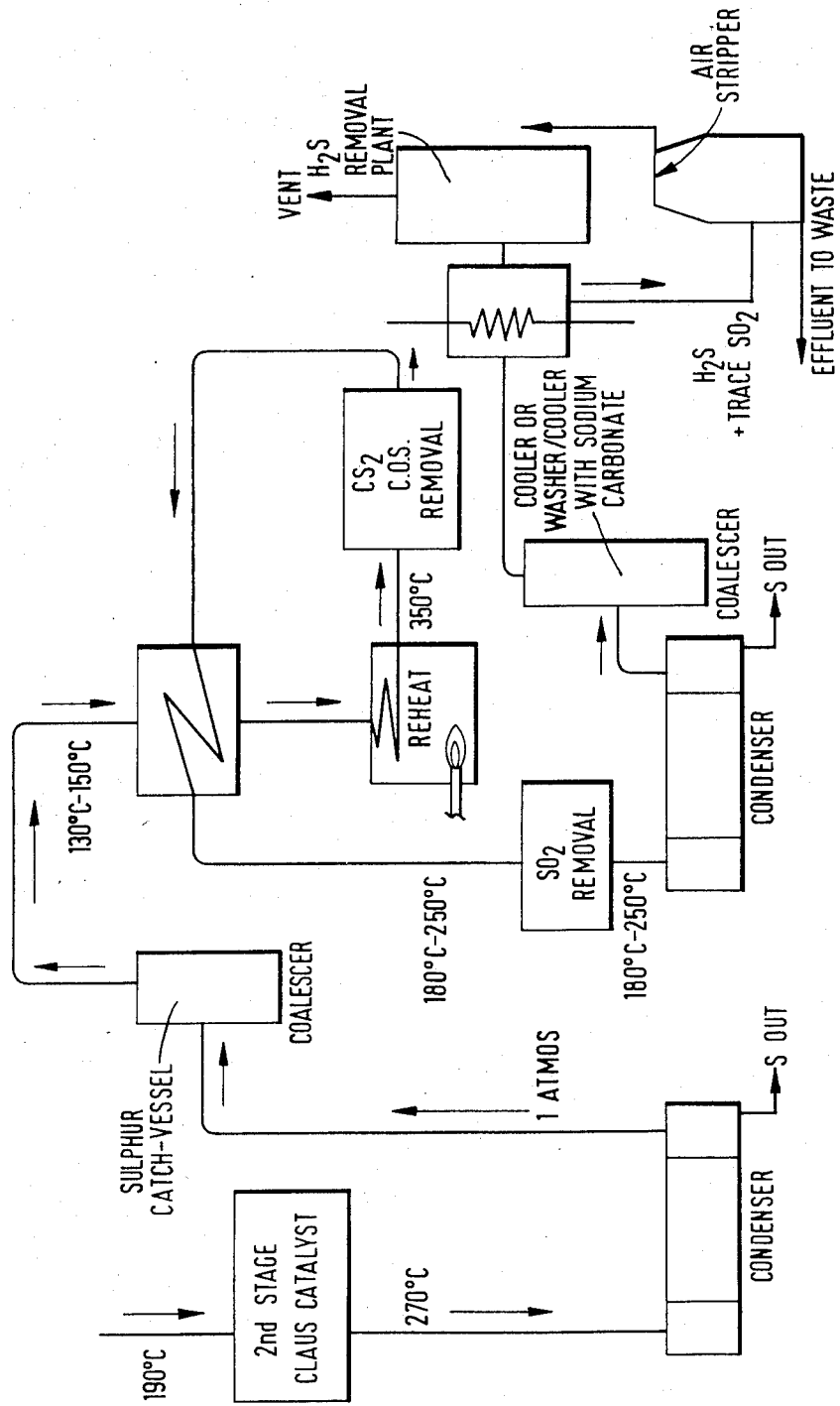

3,798,315
TREATMENT OF GASES
Thomas Nicklin, Bamford, Rochdale, England, assignor to The Gas Council, London, England
Filed Oct. 26, 1971, Ser. No. 192,032
Claims priority, application Great Britain, Oct. 27, 1970, 51,062/70
Int. Cl. C01b 17/04
U.S. Cl. 423—574                                2 Claims

ABSTRACT OF THE DISCLOSURE

A process for the production of sulphur from a gaseous mixture containing hydrogen sulphide and sulphur dioxide. The gaseous mixture in a reactor vessel is contacted with a catalyst comprising oxides of nickel and uranium whereby hydrogen sulphide and sulphur dioxide are reacted together to yield sulphur.

---

The invention relates to the treatment of gases and more particularly to the recovery of sulphur from gases containing hydrogen sulphide.

A conventional process for recovering sulphur from hydrogen sulphide-containing gases is to burn the hydrogen sulphide in the presence of a controlled amount of air in order to convert part of the gas to sulphur dioxide, and then to pass the resulting gaseous mixture through a reactor vessel containing a suitable catalyst on which occurs the reaction $$2H_2S + SO_2 \rightarrow 3S + H_2O$$

This process is known as the Claus Kiln process.

The temperature of the reactor is usually maintained at a temperature just high enough to prevent deposition of sulphur on the catalyst, and the treated gases are then cooled to condense the sulphur. If necessary several reactors in series are employed in order to reduce the amount of chemically combined sulphur present in the mixture. The catalysts employed are usually bauxite, other aluminas, or certain compounds of titanium, and are preferably shaped.

The process performs the dual function of recovery of sulphur and at least partial desulphurization of effluent gases which latter may permit the gases resulting from the plant to be discharged into the atmosphere.

Where air pollution is a problem, however, for example where it is the subject of strict legislation, the effluent gases from the conventional Claus Kiln process may still be found to contain intolerable concentrations of sulphur dioxide or hydrogen sulphide. The presence of small amounts must in some cases be removed if the effluent gas is to be discharged into the atmosphere.

According to the present invention there is provided a process for the production of sulphur from a gaseous mixture containing hydrogen sulphide and sulphur dioxide, which process comprises contacting the gaseous mixture in a reactor vessel with a catalyst comprising oxides of nickel and uranium whereby hydrogen sulphide and sulphur dioxide are reacted together to yield sulphur.

Preferably the nickel and uranium oxides are disposed on a catalyst carrier. Bauxite, corundum or active alumina is preferred as the carrier, but silica, kaolin, powdered brick, or an alkaline earth metal oxide or mixtures thereof may also be used.

The proportion of nickel oxide present in the catalyst is preferebaly from 1 percent to 20 percent, more preferably 3 percent to 15 percent based on the weight of the metal in relation to the total weight of the catalyst. Uranium oxide is preferably present in an amount of from 2 percent to 15 percent, more preferably from 6 percent to 10 percent based on the weight of the metal in relation to the total weight of the catalyst.

Apart from being active in catalyzing the reaction $$2H_2S + SO_2 \rightarrow 2H_2O + 3S$$

the catalysts used in the process of the present invention also act in the removal of carbon disulphide and carbon oxysulphide, two impurities which must in general be removed from gases before discharging into the atmosphere, and which may be present in a gas mixture containing hydrogen sulphide, which mixture is derived from, for example, a hydrocarbon feedstock, or a gas containing oxides of carbon.

Thus in a preferred aspect of the invention some or all of the hydrogen sulphide present in the gas is produced by the reaction of carbon disulphide and/or carbon oxysulphide with steam in the presence of the catalyst as described above for use in the process of the invention.

The reactions of steam with carbon disulphide and carbon oxysulphide are as follows:

$$CS_2 + 2H_2O \rightarrow CO_2 + 2H_2S$$

$$COS + H_2O \rightarrow CO_2 + H_2S$$

Conveniently, the removal of carbon oxysulphide and/or carbon disulphide by reaction with steam takes place in the same reactor as the reaction of hydrogen sulphide with sulphur dioxide. Alternatively the carbon oxysulphide and/or carbon disulphide are removed in the absence of sulphur dioxide. If the only reaction taking place in the reactor is the conversion of carbon oxysulphide and/or carbon disulphide to hydrogen sulphide and carbon dioxide, then the temperature of the reactor is preferably from 420° C. to 480° C.

The process of the invention may conveniently be incorporated in, or added onto, the conventional Claus Kiln process. Thus the gases containing hydrogen sulphide may be passed through a first stage consisting of a reactor vessel containing a suitable catalyst maintained at a temperature of not less than the dew point of the sulphur formed, and from which the gases pass to a sulphur condenser and coalescer, and thence to a second stage identical to the first. As the sulphur content of the gases is reduced, so the dew point is lowered and hence the temperature at which the reactor is maintained may be reduced. A low temperature is desirable in order to encourage the shift of the equilibrium to favor the formation of sulphur. One or more additional stages may be employed if necessary, the temperature being lowered each time.

At least one of the stages of the process described above includes a reactor in which hydrogen sulphide reacts with sulpur dioxide in the presence of a catalyst as herein described and comprising an oxide of nickel preferably together with an oxide of uranium. In this reactor the carbon disulphide and carbon oxysulphide, if present, react with steam to form hydrogen sulphide and carbon dioxide.

It may be desirable to eliminate carbon disulphide and/or carbon oxysulphide at the earliest possible stage in a Claus Kiln process and for this purpose, the gases from the combustion stage may be brought into contact with a catalyst as herein described comprising nickel oxide preferably together with uranium oxide. Thus removal of carbon disulphide and/or carbon oxysulphide requires the presence of steam and it is expected that sufficient steam will be produced during the combustion stage. If hydrogen sulphide and sulphur dioxide are both present in the gas then this stage will constitute the first stage of a Claus Kiln process; if they are not both present, then the stage will form a preliminary stage to the Claus Kiln process. Development has taken place in recent years of processes for almost complete removal from gaseous mixtures, of hydrogen sulphide. These processes include passing the gases over zinc oxide and, more especially, the process known as the "Stretford Process," described in British patent specification No. 948,270, which involves washing the gas with a solution of sodium vanadate and the sodium salt of anthraquinone disulphonic acid. Such liquid purification processes will not readily tolerate the presence of sulphur dioxide, and it is therefore preferable, as far as possible, to remove substantially all of this gas from the gas mixture prior to such removal of remaining hydrogen sulphide. Thus it may be desirable to adjust the proportion of sulphur dioxide formed in the combustion step of a Claus Kiln process, so that after the reactions a slight excess of hydrogen sulphide, rather than sulphur dioxide, results. The excess hydrogen sulphide may then be removed by a further desulphiding stage. The last traces of sulphur dioxide may be removed, if desired, by washing the gas with sodium carbonate solution, or the like.

A specific embodiment of the process of the present invention will now be described with reference to the accompanying flow diagram.

A gas mixture comprising hydrogen sulphide is burnt at about 1000° C. and in a controlled amount of air to convert a proportion of the hydrogen sulphide present to sulphide dioxide. Some sulphur may also be produced, and the gas, after passing through a waste heat boiler is passed through a first sulphur condenser. The gas is then passed through a reactor vessel containing a Claus Kiln catalyst such as bauxite, at a temperature of 270° C., in which reactor the Claus Kiln reaction, $$2H_2S + SO_2 \rightarrow 2H_2O + 3S\downarrow$$ takes place.

The effluent gases are cooled in a sulphur condenser, a coalescer and the sulphur removed. The gases are then reheated and passed through a second Claus Kiln reactor at 190°C. containing bauxite as a catalyst, the gases leaving the reactor then passing through a sulphur condenser and to a sulphur catch vessel.

Thus far the process is a conventional Claus Kiln process. The gases coming out of the sulphur catch vessel however, are not allowed into the atmosphere, or recycled, but are passed through a heat exchanger and then through a reactor vessel at 350° C., the reactor vessel containing, as a catalyst, alumina having on its surface nickel and uranium oxides. In this reactor any carbon disulphide and carbon oxysulphide reacts with water vapor to form hydrogen sulphide and carbon dioxide in accordance with the reaction equations $$CS_2 + 2H_2O \rightarrow CO_2 + 2H_2S$$

$$COS + H_2O \rightarrow CO_2 + H_2S$$

The catalyst further encourages the Claus Kiln reaction referred to above, which reaction therefore removes the hydrogen sulphide formed in the decomposition of carbon disulphide and carbon oxysulphide.

The gas from the reactor contains a low proportion of sulphur dioxide, which is removed almost entirely by passing the gases through a further reactor containing active alumina, or a nickel uranium catalyst as hereinbefore described, and maintained at 180° C., to 250° C. The gas stream is then passed through a final sulphur condenser and coalescer before entering a plant for stripping off the remaining hydrogen sulphide.

EXAMPLE

To demonstrate the effectiveness of a nickel-uranium catalyst in the removal of sulphur dioxide and carbon disulphide in a mixture of gases containing, in addition, hydrogen sulphide, a gas flow, having a composition typical of a gas effluent from the Claus Kiln process was heated to a temperature of 140° C. and thence passed at atmospheric pressure, into a stainless steel reactor containing a catalyst comprising a gamma alumina carrier on which were disposed nickel oxide and uranium oxide in proportions of 3.55 percent nickel oxide, and 5.77 percent uranium oxide, expressed as the weight of the metals in relation to the total weight of the catalyst.

| Bed temperature, ° C. | Space velocity, hrs.-1 | Steam, percent | Inlet gas composition, percent of— | | | | Outlet gas composition, percent of— | | | |
|---|---|---|---|---|---|---|---|---|---|---|
| | | | H$_2$S | SO$_2$ | COS | CS$_2$ | H$_2$S | SO$_2$ | COS | CS$_2$ |
| 333 | 5,060 | 32 | 0.75 | 0.13 | 0.66 | 0.90 | 2.35 | 0.05 | 0.001 | <0.01 |
| 330 | 4,950 | 31 | 0.75 | 0.13 | 0.66 | 0.90 | 2.35 | 0.05 | 0.001 | 0.015 |
| 322 | 5,000 | 30 | 0.75 | 0.13 | 0.66 | 0.90 | 2.30 | 0.05 | 0.001 | 0.035 |
| 320 | 10,000 | 31 | 0.75 | 0.13 | 0.66 | 0.90 | 2.11 | 0.05 | 0.017 | 0.39 |
| 333 | 10,700 | 32 | 0.75 | 0.13 | 0.66 | 0.90 | 2.37 | 0.05 | 0.01 | 0.17 |

I claim:

1. A process for the production of sulphur from a gaseous mixture containing hydrogen sulphide and sulphur dioxide, which process comprises contacting the gaseous mixture in a reactor vessel with a catalyst comprising oxides of nickel and uranium on a carrier whereby hydrogen sulphide and sulphur dioxide are reacted together to yield sulphur, the said catalyst composition comprising 1 percent to 20 percent nickel oxide, and 2 percent to 15 perecnt uranium oxide, based on the weight of the metals in relation to the total weight of the catalyst.

2. A process for the production of sulphur from a gaseous mixture containing hydrogen sulphide and sulphur dioxide, which process comprises contacting the gaseous mixture in a reactor vessel with a catalyst comprising oxides of nickel and uranium on a carrier, whereby hydrogen sulphide and sulphur dioxide are reacted together to yield sulphur, said catalyst composition comprising 3 percent to 15 percent nickel oxide, 6 percent to 10 percent uranium oxide, based on the weight of the metals in relation to the total weight of the catalyst.

References Cited

UNITED STATES PATENTS 1,900,883   3/1933   Lusby et al. _____ 423—244
3,649,169   3/1972   Nicklin _____ 423—244
2,787,519   4/1957   Hammar _____ 423—219

FOREIGN PATENTS 449,710   7/1936   Great Britain.

GEORGE O. PETERS, Examiner